May 1, 1923.

W. B. WELLS

LIGHT SIGNAL

Filed Feb. 24, 1921

1,453,535

2 Sheets-Sheet 1

INVENTOR:
W. B. Wells,
by
A. L. Vencill
His ATTORNEY.

Patented May 1, 1923.

1,453,535

UNITED STATES PATENT OFFICE.

WESLEY B. WELLS, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA.

LIGHT SIGNAL.

Application filed February 24, 1921. Serial No. 447,443.

*To all whom it may concern:*

Be it known that I, WESLEY B. WELLS, a citizen of the United States, residing at Pittsburgh, in the county of Allegheny and State of Pennsylvania, have invented certain new and useful Improvements in Light Signals, of which the following is a specification.

My invention relates to light signals, that is, signals comprising a lamp and an optical device for projecting a beam of light from the lamp. Signals embodying my invention are particularly well adapted for use in railway signaling, although they are not limited to this specific use.

One feature of my invention is the provision of novel means for mounting the lamp so that it is adjustable in all directions with relation to the optical projecting device.

I will describe one form of the signal embodying my invention, and will then point out the novel features thereof in claims.

Figure 2:
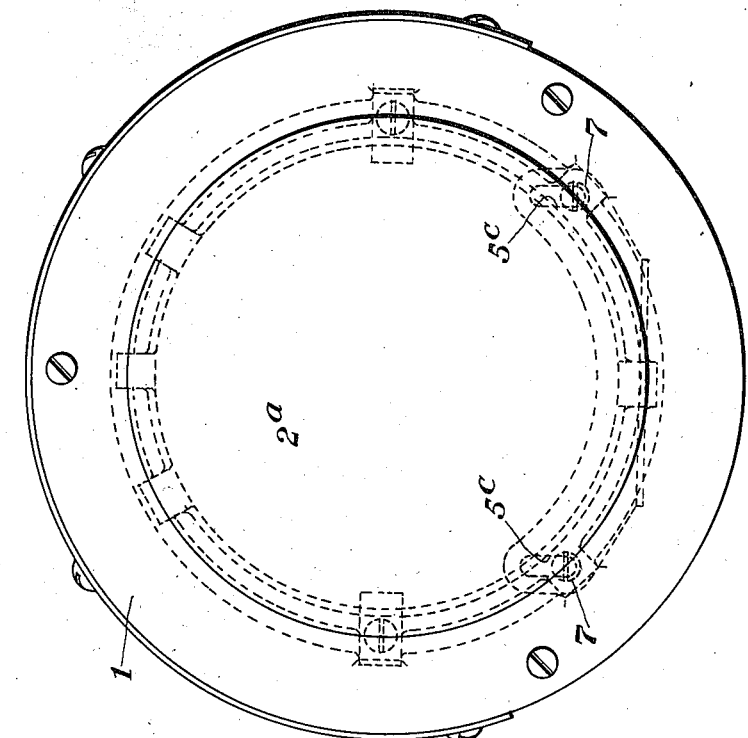
Figure 1:
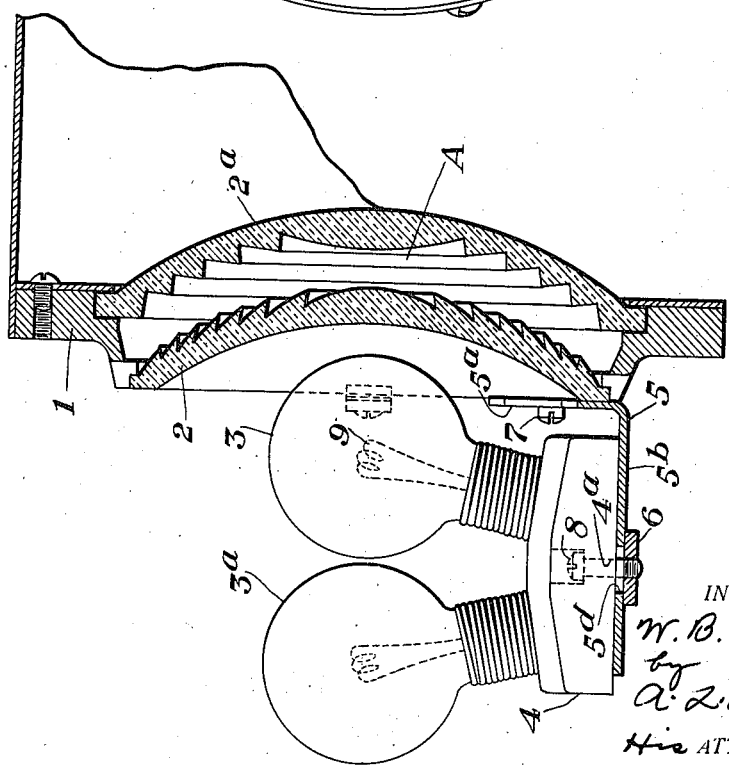
Figure 3:
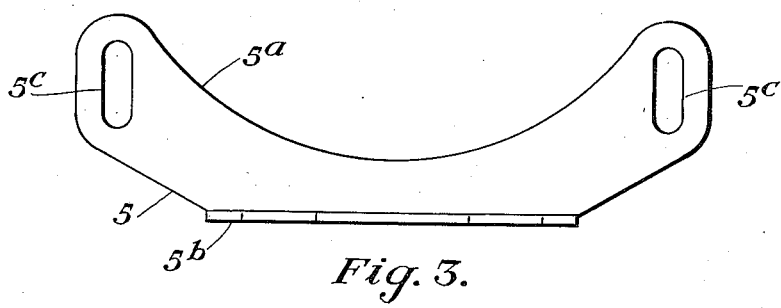
Figure 4:
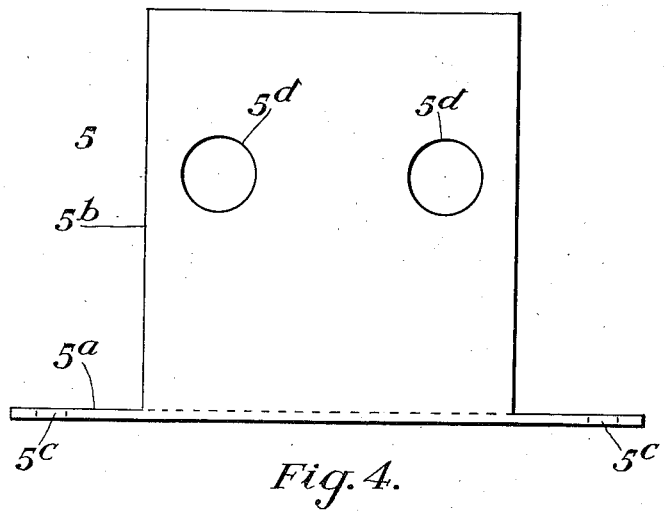
Figure 5:
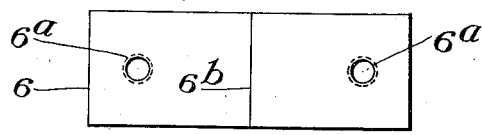
Figure 6:
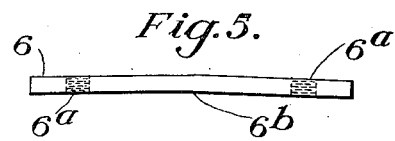

In the accompanying drawings, Fig. 1 is a view showing in vertical longitudinal section one form of signal embodying my invention. Fig. 2 is a front view of the signal shown in Fig. 1. Fig. 3 is a view showing in rear elevation a bracket included in the signal shown in Fig. 1. Fig. 4 is a top plan view of the bracket. Fig. 5 is a top plan view, and Fig. 6 a side view, of a plate forming part of the signal shown in Figs. 1 and 2.

Similar reference characters refer to similar parts in each of the several views.

Referring first to Figs. 1 and 2, the signal comprises a frame or box 1 which supports an optical device for projecting a beam of substantially parallel rays from a source of light. As here shown, the optical device is a lens combination A comprising two lenses 2 and $2^a$, although it is understood that any other suitable type of optical device may be used as desired. The main source of light is an incandescent lamp 3, the filament of which is located at the focal point of the lens combination A. As here shown, the signal is provided with an auxiliary lamp $3^a$ the function of which is to maintain the illumination of the signal in the event that the main lamp burns out or becomes extinguished for any other reason. The filament of this auxiliary lamp is a considerable distance from the focal point of the lens combination, and so, of course, the light from this lamp is not used efficiently, but it serves to keep the signal illuminated, when the main lamp burns out, until the main lamp can be renewed.

To secure the best results, particularly when the signal is employed for giving indications in daylight as well as night, the center of the filament 9 in lamp 3 should be at the focal point of the lens combination A. In commercial lamps, however, the position of the filament with respect to the base is not the same for all lamps, and so it is desirable to mount the lamp in a support which is adjustable with respect to the lens combination. In accordance with my invention, this is accomplished as follows:

The reference character 5 designates a bracket having a vertical member $5^a$ and a horizontal member $5^b$; this bracket is illustrated in detail in Figs. 3 and 4. The vertical member $5^a$ is provided with two vertically elongated holes $5^c$, $5^c$, and the bracket is attached to the signal frame 1 by screws 7 passing through these holes. It will be seen, therefore, that the bracket is adjustable in a vertical direction with respect to the frame 1, and so with respect to the lenses 2, $2^a$.

The horizontal member $5^b$ of the bracket 5 is provided with two holes $5^d$, $5^d$, and the lamp receptacle 4, which rests directly on this member, has two holes $4^a$ (one behind the other in Fig. 1) the centers of which are spaced the same distance apart as the centers of the holes $5^d$. The bracket holes $5^d$, however, are considerably larger in diameter than the receptacle holes $4^a$. Passing through each hole $4^a$ and the registering hole $5^d$ is a screw 8 the shank of which is of such size as to fit snugly in the receptacle hole $4^a$, so that there is considerable clearance between this screw and the hole $5^d$. To hold these screws in place, and to clamp the lamp receptacle and the bracket together, I provide a plate 6 which is located directly beneath the bracket member $5^b$, and which (see Figs. 5 and 6) has two holes $6^a$, $6^a$ spaced the same distance apart as the receptacle holes $4^a$. Each hole $6^a$ is threaded to receive one of the screws 8. It follows that by drawing up the screws 8 tightly in the holes 6ª, the receptacle 4 can be clamped tightly in place on the bracket 5. It also follows that by releasing the screws 8 the receptacle 4 and plate 6 may be adjusted in any direction in a horizontal plane with relation to the bracket 5, owing to the clearance between the screws and the holes 5ᵈ, and that the parts can then be clamped together in adjusted position by again tightening the screws.

The plate 6 is preferably of thin metal, and, as here shown, it is bent slightly on a transverse line 6ᵇ midway between the two holes 6ª, so that the center lines of these holes are slightly displaced from parallelism. This causes a binding effect when the screws are tightened, and so serves to lock the screws in place.

The manipulation of the adjusting mechanism is as follows: Vertical adjustment of the lamp is obtained by loosening the two screws 7 and moving the bracket 5 up or down until the center of the filament 9 is the proper height, and then locking the bracket in adjusted position by again tightening the screws 7. The horizontal adjustment is accomplished by loosening the screws 8 and moving the lamp receptacle 4 forward or backward, or from side to side, until the filament 9 is in the desired horizontal position, whereupon the screws 8 are again tightened.

It will be seen from the foregoing that the adjustments are independent of each other, that is, the adjustment in either the vertical or the horizontal plane can be made without destroying the adjustment that has previously been made in the other of these planes.

Although I have herein shown and described only one form of signal embodying my invention, it is understood that various changes and modifications may be made therein within the scope of the appended claims without departing from the spirit and scope of my invention.

Having thus described my invention, what I claim is:

1. A light signal comprising a frame, an optical projecting device mounted in said frame, a bracket attached to said frame and adjustable vertically with relation thereto, said bracket having a horizontal member provided with relatively large round holes, a lamp receptacle resting on said member and provided with relatively small holes, a plate located underneath said horizontal member and provided with threaded holes, screws passing snugly through the holes in said receptacle and through the holes in said bracket with considerable clearance and screwing into the holes in said plate, and a lamp mounted in said receptacle for supplying light to said optical projecting device.

2. A light signal comprising a frame, an optical projecting device mounted in said frame, a bracket attached to said frame and adjustable vertically with relation thereto, said bracket having a horizontal member provided with relatively large holes, a lamp receptacle resting on said member and provided with relatively small holes, screws passing snugly through said small holes and with considerable clearance through said large holes, a thin metal plate located underneath said horizontal member and provided with threaded holes co-operating with said screws, said plate being bent so that when in its normal shape the center lines of the holes therein are slightly displaced from parallelism, and a lamp supported by said receptacle for furnishing light to said optical projecting device.

In testimony whereof I affix my signature.

WESLEY B. WELLS.